United States Patent [19]

Traut

[11] 4,141,607
[45] Feb. 27, 1979

[54] EXTREME TEMPERATURE ROLLING CONTACT BALL BEARINGS

[76] Inventor: Earl W. Traut, 8040 Palm Lake Dr., Orlando, Fla. 32811

[21] Appl. No.: 872,218

[22] Filed: Jan. 25, 1978

Related U.S. Application Data

[60] Continuation-in-part of Ser. No. 688,225, May 20, 1976, abandoned, which is a division of Ser. No. 424,553, Dec. 13, 1973, Pat. No. 3,969,005.

[51] Int. Cl.² ............................................. F16C 19/26
[52] U.S. Cl. .................................................. 308/200
[58] Field of Search ............... 308/200, 199, 206, 209, 308/208, 189 A, 184, DIG. 14, 195

[56] References Cited

U.S. PATENT DOCUMENTS

| | | | |
|---|---|---|---|
| 854,505 | 5/1907 | Keiper | 308/200 |
| 951,847 | 3/1910 | Seubert | 308/200 |

Primary Examiner—Trygve M. Blix
Assistant Examiner—Douglas C. Butler

[57] ABSTRACT

Radial load ball bearings in which the elements are in rolling contact only, the load bearing balls being separated by smaller spacing balls which are held in position by a spring-disk. Spring-disk pressure holds the load bearing balls against both races during broad temperature changes and accommodates manufacturing tolerances in the size of the balls.

2 Claims, 3 Drawing Figures

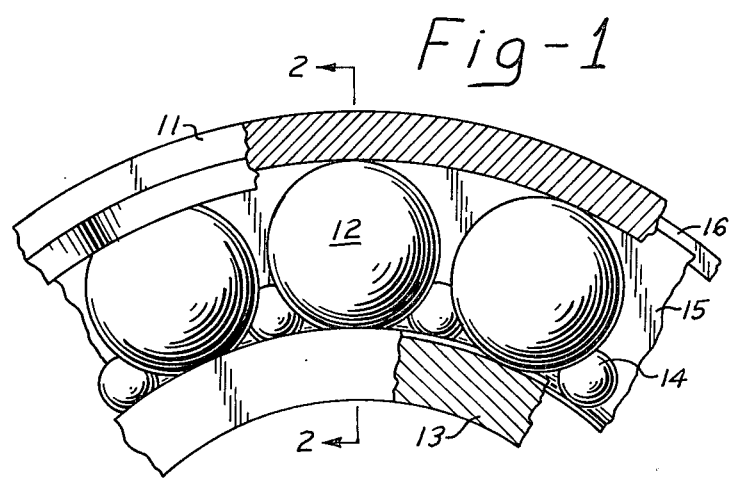
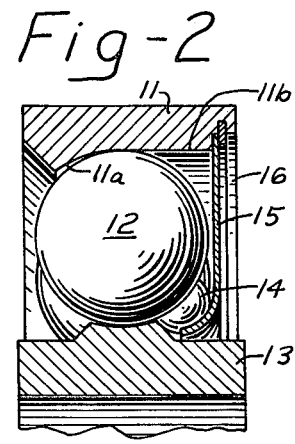
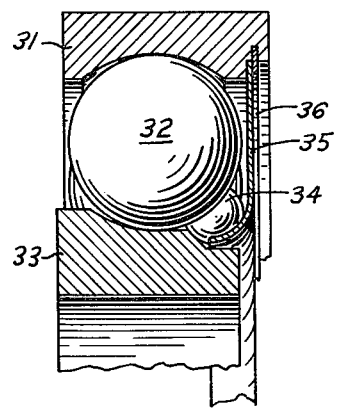

EXTREME TEMPERATURE ROLLING CONTACT BALL BEARINGS

RELATIONSHIP TO PRIOR APPLICATION AND PATENTS

This invention is a continuation-in-part of my earlier patent application entitled "Rolling Contact Ball Bearings", filed May 20, 1976, Ser. No. 688,225, now abandoned which is a division of Ser. No. 424,553, filed Dec. 13, 1973, now U.S. Pat. No. 3,969,005 entitled "Rolling Contact Devices". This invention also bears a definite relationship to my U.S. Pat. No. 3,989,324 entitled "Rolling Contact Bearings".

BACKGROUND OF THE INVENTION

1. Field of the Invention

This invention relates to that class of bearings whose elements are in rolling contact only and which can maintain their load bearing capability over a broad temperature range.

2. Description of Prior Art

Most ball bearings currently in use include sliding friction between their rotating elements and retaining means. Also, they do not provide for maintaining accurate centering of the races with respect to each other during temperature extremes or due to manufacturing tolerances.

SUMMARY OF THE INVENTION

This invention provides radial load ball bearings in which loads are transferred from an outer race through major balls to an inner race. Instead of cages, spacing balls are alternately interposed between the major balls to prevent their mutual contact. The spacing balls are positioned radially inwards of the major balls but axially displaced from the plane of the bearing, and are held in position by a spring-disk which is affixed to the outer race.

The spring action of the disk will cause the spacing balls to push any major balls which are smaller in size onto a slightly smaller-diameter portion of both races, where they can carry their share of the bearing load. Similary, temperature differentials which cause an increase in internal bearing clearance will automatically cause the spring-disk to move the major balls onto a slightly smaller-diameter portion of the outer race, thus maintaining centering of the two races with respect to each other and causing each major ball to carry its share of the load.

It is therefore a principal object of my invention to provide a ball bearing which will automatically maintain internal alignment over a broad temperature range.

It is another object of my invention to provide a ball bearing in which each load-carrying ball will carry its share of the load despite differences in the size of the load carrying balls.

It is a further object of my invention to provide a ball bearing in which all elements are in rolling contact only.

It is yet another object of my invention to provide a ball bearing which does not require lubrication.

A yet further object of my invention is to minimize high speed ball bearing vibration.

Still another object of my invention is to provide a ball bearing in which each load bearing ball rotates continually around the same axis.

Other objects of this invention will appear from the following description and appended claims, reference being had to the accompanying drawings forming a part of this specification wherein like characters designate corresponding parts in the several views.

FIG. 1 is a partial face view of an extreme temperature rolling contact ball bearing in which loads are transferred between races through major balls, spacing balls providing separation therebetween.

FIG. 2 is a sectional view of FIG. 1 taken along lines 2—2 and looking in the direction of the arrows.

FIG. 3 is a sectional view of the upper portion of an extreme temperature rolling contact ball bearing similar to that of FIGS. 1 and 2, but in which the inner race, rather than the outer race, has a cylindrical race section.

DETAILED DESCRIPTION

FIGS. 1 and 2 depict a radial load rolling contact ball bearing in which radial bearing loads are transferred from outer race 11 through major balls 12 to inner race 13. Spacing balls 14 are interposed between balls 12 to prevent them from contacting each other. Spring-disk 15 holds spacing balls 14 in position between major balls 12 and is itself fastened to outer race 11 by snap ring 16.

Surface 11a of outer race 11 is spherically shaped to permit any major balls 12 which, due for instance to manufacturing tolerances, are slightly smaller in diameter to be moved slightly to the left by the pressure of spring-disk 15 against spacing balls 14. This assures that each major ball 12 will carry its share of the bearing load and also maintain precise centering of race 13 with respect to race 11. It also tends to eliminate the high speed vibration which could otherwise be caused by the minute differences in diameter of balls 12 or by internal clearance within the bearing. Surface 11b is cylindrical to aid in assembly of the bearing.

It should be noted that the bearing of FIGS. 1 and 2 can readily be designed to operate within a broad temperature range. The contact diameters of races 11 and 13 should be designed so that there is zero internal clearance at the lowest anticipated outer race 11 temperature and highest anticipated inner race 13 temperature. At all other temperatures major balls 12 will be slightly displaced to the left by the pressure of spring-disk 15 to maintain their contact with races 11 and 13. There being no sliding contact between any of the elements, the bearing may be operated at extremely high or low temperatures without using lubrication.

All elements will be in rolling contact and balls 12 will maintain an axis of rotation parallel to the axis of the bearing if the following dimensional ratios are maintained: $D_1/D_2 = d_1/d_2$; where $D_1$ is the diameter of the inner periphery of race 11 where it contacts balls 12, $D_2$ is the diameter of the circle of contact of spacing balls 14 on spring-disk 15, $d_1$ is the diameter of major balls 12, and $d_2$ is the diameter of the circle of contact on major balls 12 where they are contacted by spacing balls 14. For some applications a deviation from this ratio may be desirable, in that such deviation will cause the axis of rotation of major balls 12 to continually shift as they rotate, so that the entire surface of each major ball 12 contacts the races, thus assuring even wear.

Reference to FIGS. 5-6 and the descriptive material in column 5, lines 25-37 of my U.S. Pat. No. 3,989,324 will provide further explanation of how sliding contact is avoided. Note that the dimensions $D_1$, $D_2$, $d_1$, and $d_2$ of the formula in the preceding paragraph are directly comparable to $D_1$, $D_2$, $d_1$, and $d_2$ respectively of column 5, lines 34–37 of my U.S. Pat. No. 3,989,324; elements 11, 12, 14 and 15 of the instant FIGS. 1-2 being comparable to elements 51a, 52, 53 and 51b respectively of FIGS. 5-6 of U.S. Pat. No. 3,989,324.

The bearing of FIG. 3 is similar to that of FIG. 1. In FIG. 3, bearing loads pass from outer race 31 through major balls 32 to inner race 33. Spacing balls 34 are held in position between major balls 32 by spring-disk 35, which itself is fastened to outer race 31 by snap ring 36. In FIG. 3, inner race 33 includes a cylindrical portion, rather than outer race 11 as in FIGS. 1 and 2.

I claim:
1. A rolling contact bearing comprising:
an outer race,
said outer race being circular,
an inner race,
said inner race being circular and coaxially located radially inwards of said outer race,
first rotating means,
said first rotating means comprising major balls located between and in rolling contact with said outer race and said inner race,
second rotating means,
said second rotating means comprising spacing balls which are interposed between and in rolling contact with said major balls,
said spacing balls being positioned radially inwards of said major balls and axially displaced from a plane through the centers of same,
a spring-disk,
said spring-disk being affixed to said outer race and serving to hold said second rotating means in position against said first rotating means,
said spring-disk being ring-shaped, thin axially and broad radially, to permit same to deflect appreciably in the axial direction, thus serving to accommodate changes in size and position of said major balls and said spacing balls.

2. The rolling contact bearing as claimed in claim 1 in which:
the ratio of the contact diameter of the inner periphery of said outer race to the contact diameter of said spring-disk where it contacts said spacing balls,
is equal to the ratio of the diameter of said major balls to the diameter of the circle upon same made by contact with said spacing balls.

* * * * *